(12) United States Patent
Thoreau et al.

(10) Patent No.: US 9,008,178 B2
(45) Date of Patent: Apr. 14, 2015

(54) METHOD FOR DECODING A STREAM OF CODED DATA REPRESENTATIVE OF A SEQUENCE OF IMAGES AND METHOD FOR CODING A SEQUENCE OF IMAGES

(75) Inventors: Dominique Thoreau, Cesson Sevigne Cedex (FR); Edouard Francois, Bourg des Comptes (FR); Jerome Vieron, Paris (FR); Fabien Racape, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 464 days.

(21) Appl. No.: 13/388,047

(22) PCT Filed: Jul. 29, 2010

(86) PCT No.: PCT/EP2010/061013
§ 371 (c)(1),
(2), (4) Date: Jan. 30, 2012

(87) PCT Pub. No.: WO2011/012669
PCT Pub. Date: Feb. 3, 2011

(65) Prior Publication Data
US 2012/0128068 A1 May 24, 2012

(30) Foreign Application Priority Data
Jul. 30, 2009 (FR) ...................................... 09 55353

(51) Int. Cl.
*H04N 7/12* (2006.01)
*G06K 9/46* (2006.01)
(Continued)

(52) U.S. Cl.
CPC ... *H04N 19/00024* (2013.01); *H04N 19/00145* (2013.01); *H04N 19/00278* (2013.01); *H04N 19/00575* (2013.01); *H04N 19/00545* (2013.01)

(58) Field of Classification Search
CPC . H04N 7/26244; H04N 7/50; H04N 7/26313; H04N 7/30; H04N 7/26335; H04N 19/00278; H04L 27/2071; H03D 5/00; H04B 1/40

USPC ............................... 375/240.12; 382/233, 236
See application file for complete search history.

(56) References Cited

U.S. PATENT DOCUMENTS

2003/0215014 A1 11/2003 Koto et al.
2007/0065026 A1 3/2007 Lee et al.
(Continued)

FOREIGN PATENT DOCUMENTS

CN 1933601 3/2007
CN 1984340 6/2007
(Continued)

OTHER PUBLICATIONS

Yin et al., "Localized Weighted Prediction for Video Coding", IEEE May 23, 2005, pp. 4365-4368.
(Continued)

*Primary Examiner* — Dave Czekaj
*Assistant Examiner* — Tsion B Owens
(74) *Attorney, Agent, or Firm* — Myers Wolin LLC

(57) ABSTRACT

A method for decoding a stream of coded data representative of a sequence of images is disclosed. The decoding method comprises:
  determining a prediction block,
  calculating the average of said prediction block,
  reconstructing, from said stream, a DC coefficient and AC coefficients relating to said current block,
  calculating an average of said current block from said average of said prediction block and said DC coefficient,
  calculating a weighted prediction parameter as being the ratio of the average of said current block and the average of said prediction block,
  transforming a block of coefficients comprising a null value as DC coefficient and said reconstructed AC coefficients into a residual block,
  reconstructing the current block by merging said residual block and said prediction block weighted by said weighted prediction parameter.

Figure 1:
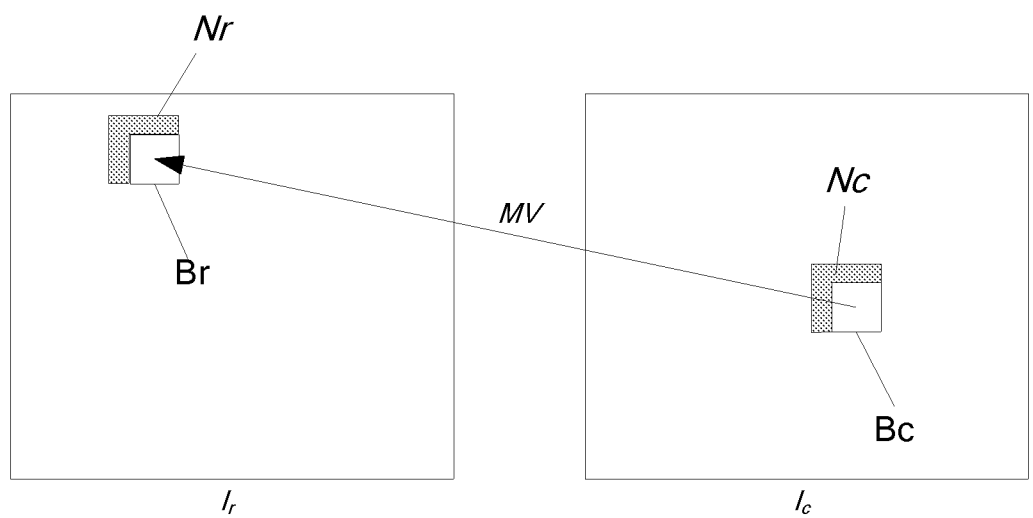

A method for coding is further disclosed.

27 Claims, 4 Drawing Sheets

(51) Int. Cl.
*H04N 19/105* (2014.01)
*H04N 19/137* (2014.01)
*H04N 19/176* (2014.01)
*H04N 19/503* (2014.01)
*H04N 19/46* (2014.01)

(56) References Cited

U.S. PATENT DOCUMENTS

| | | | |
|---|---|---|---|
| 2007/0098067 | A1 | 5/2007 | Kim et al. |
| 2008/0175322 | A1* | 7/2008 | Lee et al. ............ 375/240.16 |
| 2008/0205528 | A1 | 8/2008 | Song et al. |
| 2008/0304760 | A1 | 12/2008 | Lee et al. |
| 2009/0041119 | A1 | 2/2009 | Thoreau et al. |
| 2009/0207913 | A1* | 8/2009 | Kim et al. ............ 375/240.12 |
| 2010/0310184 | A1 | 12/2010 | Yu et al. |

FOREIGN PATENT DOCUMENTS

| | | |
|---|---|---|
| CN | 101159875 | 4/2008 |
| CN | 101313581 | 11/2008 |
| JP | 2004007379 | 1/2004 |
| JP | 2008306720 | 12/2008 |
| WO | WO2006033053 | 3/2006 |
| WO | WO2006128072 | 11/2006 |
| WO | WO2007092215 | 8/2007 |
| WO | WO2007094792 | 8/2007 |
| WO | WO2010086393 | 8/2010 |
| WO | WO2012123321 | 9/2012 |

OTHER PUBLICATIONS

Boyce, "Weighted Prediction in the H.264/MPEG AVC Video Coding Standard", IEEE International Symposium on Circuits and Systems, vol. I of V, May 23, 2004, pp. III-789-III-792.

Kim et al., "Fast Local Motion-Compensation Algorithm for Video Sequences with Brightness Variations", IEEE Transactions on Circuits and Systems for Video Technology, vol. 13, No. 4, Apr. 1, 2003, pp. 289-299.

Search report dated Feb. 21, 2011.

Zheng etal: "Intra prediction using template matching with adaptive illumination compensation", 15th IEEE international conference on image processing (ICIP 2008), IEEE Oct. 2008, pp. 125-128.

International Organization for Standardization Organization ISO/IEC JTC1/SC29/WG11, "Coding of moving pictures and audio", MPEG02/N4920, Jul. 2002, Klagenfurt, AT, pp. 1-207.

Kamp et al., "Decoder side motion vector derivation", Video Coding Experts Group, 33rd meeting, Shenzhen, China, Oct. 20, 2007, pp. 1-24.

Richardson, Iain, "H264 and MPEG4 video compression", John Wiley & Sons Ltd., West Sussex, England (2003), pp. 1-7.

* cited by examiner

METHOD FOR DECODING A STREAM OF CODED DATA REPRESENTATIVE OF A SEQUENCE OF IMAGES AND METHOD FOR CODING A SEQUENCE OF IMAGES

This application claims the benefit, under 35 U.S.C. §365 of International Application PCT/EP2010/061013, filed Jul. 29, 2010, which was published in accordance with PCT Article 21(2) on Feb. 3, 2011 in English and which claims the benefit of French patent application No. 0955353, filed Jul. 30, 2009.

1. SCOPE OF THE INVENTION

The invention relates to the general domain of image coding. More specifically, the invention relates to a method for decoding a stream of coded data representative of a sequence of images and a method for coding a sequence of images.

2. PRIOR ART

The majority of methods for coding a sequence of images into a stream of coded data and methods for decoding this stream use temporal prediction or inter-image prediction and equally spatial prediction or intra-image prediction. Intra-image prediction or inter-image prediction enables the compression of an image sequence to be improved. It comprises, for a current block, the generation of a prediction block and the coding of a difference, also called a residual block, between the current block and the prediction block. The more the prediction block is correlated with the current block, the lower is the number of bits required to code the current block and therefore the more effective is the compression. However, inter-image (respectively intra-image) prediction loses its efficiency when there is a luminosity variation between the images of the sequence (respectively in the current image). Such a luminosity variation is for example due to a modification of illumination, to fade effects, to flashes, etc.

Methods for coding/decoding image sequences are known that account for a variation in luminosity. Hence, within the framework of the standard MPEG-4 AVC/H.264 described in the document ISO/IEC 14496-10, it is known to use a weighted prediction method in order to improve the compression in the case of a luminosity variation. For this purpose, the MPEG-4 AVC/H.264 standard enables the explicit transmission in the stream of weighted prediction parameters per images slice, an images slice comprising one or more blocks of pixels. The illumination correction by means of a weighted prediction parameter or a set of several weighted prediction parameters thus applies in the same way for all the blocks of the image slice with which the weighted prediction parameter or the set of weighted prediction parameters is associated. For example, the weighted prediction parameter is determined for a current block Bc by calculating the ratio between the average of the current block Bc and the average of a reference block Br associated with this current block using an item of motion data such as a motion vector MV as shown in FIG. 1. If the motion vector MV has a level of precision less than the pixel, then the block Br is interpolated. The average of a block is for example the average of luminance values associated with the pixels of the block. The reference block is for example determined during a step of motion estimation. Such a prediction method is precise as the luminance variation for a current block is determined from values associated with the current block. However, such a method is costly in terms of bitrate as it implies the transmission in the stream of a set of weighted prediction parameters per image slice and thus potentially per block.

It is also known in the art to correct a local luminosity variation to determine the weighting prediction parameters locally in the same way on the coder side and the decoder side. In this case the weighted prediction parameters are not transmitted explicitly in the stream. For example and in reference to FIG. 1, a weighted prediction parameter for the current block Bc is determined for a current block Bc by calculating the ratio between the average of the neighbourhood Nc of the current block Bc and the average of the neighbourhood Nr of a reference block Br associated with the current block Bc. The average of the neighbourhood is for example the average of luminance values associated with the pixels of the neighbourhood in question. Nc is situated in the causal neighbourhood of the block Bc. Nc is thus coded (respectively reconstructed) before Bc. Such a method is cheap in terms of bitrate as the weighted prediction parameters are not transmitted explicitly in the stream but are determined on the coder side and the decoder side in the same way. However, such a prediction method is less precise than the preceding method in that the weighted prediction parameter(s) associated with the current block Bc do not take into account the content of the block.

3. SUMMARY OF THE INVENTION

The purpose of the invention is to overcome at least one of the disadvantages of the prior art. For this purpose, the invention relates to a method for decoding a stream of coded data representative of a sequence of images divided into blocks comprising the following steps for a current block:
    reconstructing a residual block from the decoding of a first part of the stream of coded data relating to the current block,
    determining a prediction block, and
    reconstructing the current block by merging the residual block and the prediction block weighted by a weighted prediction parameter.

Advantageously, the weighted prediction parameter is determined according to the following steps:
    calculating the average of the prediction block,
    reconstructing the DC coefficient of the current block,
    calculating an average of the current block from the average of the prediction block and the DC coefficient, and
    calculating the weighted prediction parameter being the ratio of the average of the current block and the average of the prediction block.

According to a first embodiment variant, during the step of calculation of the average of the current block, the average of the prediction block is weighted by an initial weighted prediction parameter decoded from the stream of coded data.

According to a second embodiment variant, during the step of calculation of the average of the current block, the average of the prediction block is weighted by an initial weighted prediction parameter equal to the ratio between the average of a neighbourhood of the current block and the average of the corresponding neighbourhood of a reference block associated with said current block.

The invention also relates to a method for coding a sequence of images divided into blocks comprising the following steps for a current block:
    determining a prediction block for the current block,
    determining a residual block by extracting from the current block the prediction block weighted by a weighted prediction parameter, and
    coding the residual block.

Advantageously, the weighted prediction parameter is determined according to the following steps:
- calculating the average of the prediction block and the average of the current block,
- calculating a prediction error between the average of the current block and the average of the prediction block,
- calculating a corrected average of the current block from the average of the prediction block and the prediction error successively quantized and dequantized, and
- calculating the weighted prediction parameter as being the ratio of the average of the reconstructed current block and the average of the prediction block.

According to an embodiment variant, during the step of calculation of said prediction error, the average of said prediction block is weighted by an initial weighted prediction parameter, said initial weighted prediction parameter is coded in said stream of coded data.

According to a particular characteristic of the invention, the initial weighted prediction parameter is determined for a part of the image to which the current block belongs according to the following steps:
- determining the average of the image part, called the first average,
- determining the average of the corresponding image part to which the prediction block belongs, called the second average, and
- calculating the weighted prediction parameter as being the ratio of the first average and the second average.

According to a particular characteristic of the invention, the image part is the entire image or an image slice.

According to another embodiment variant, during the step of calculation the prediction error, the average of the prediction block is weighted by an initial weighted prediction parameter equal to the ratio between the average of a neighbourhood of the current block and the average of the corresponding neighbourhood of a reference block associated with said current block.

4. LIST OF FIGURES

Figure 2:
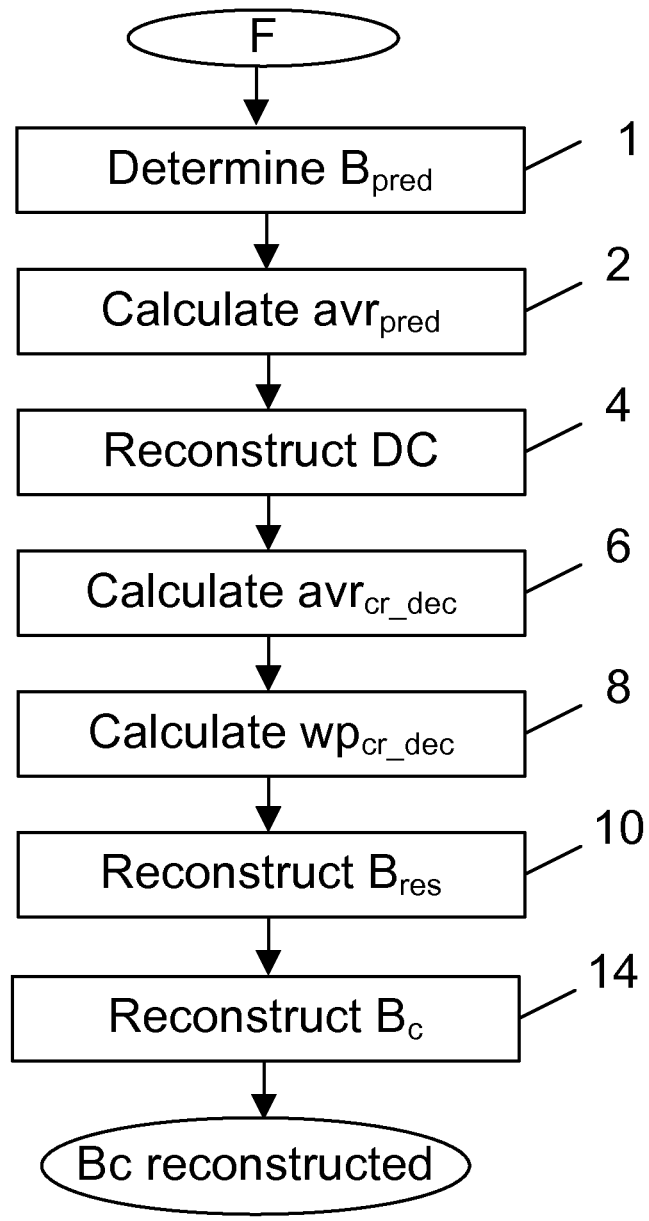
Figure 3:
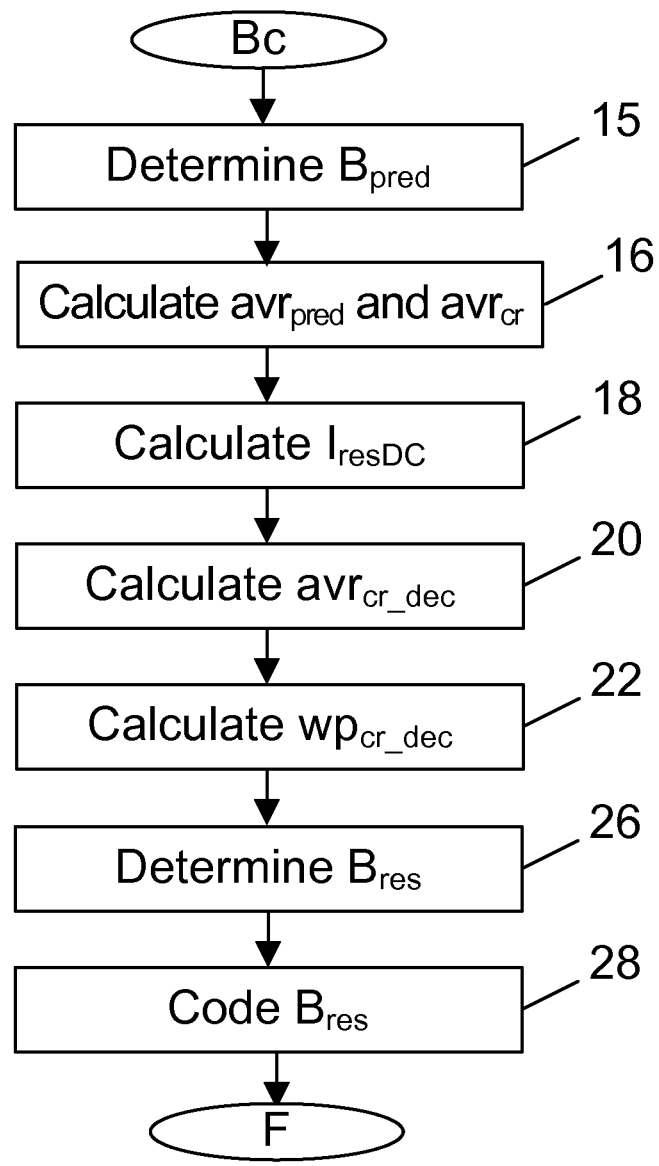
Figure 4:
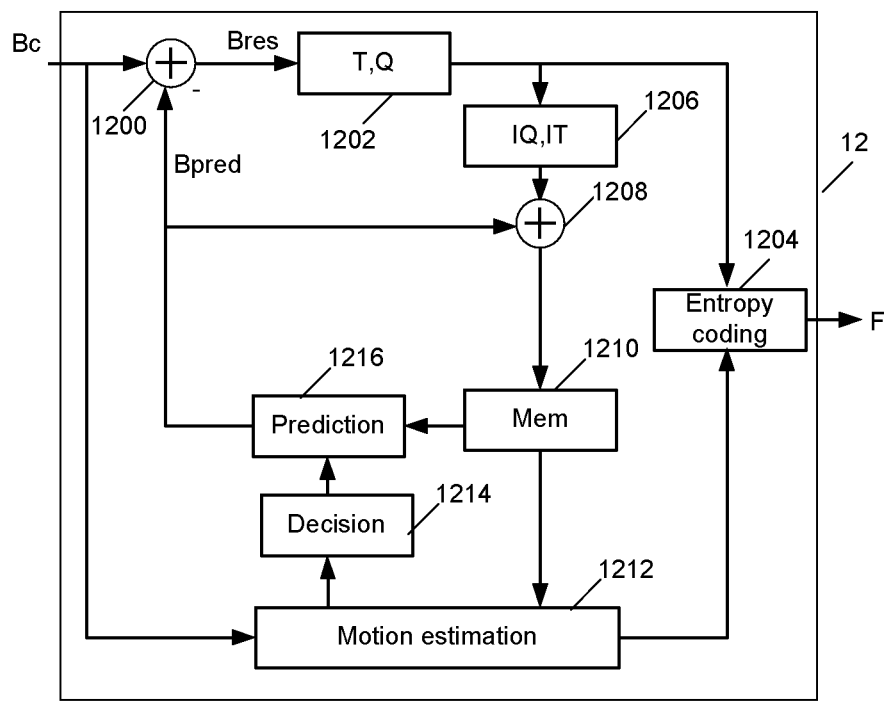
Figure 5:
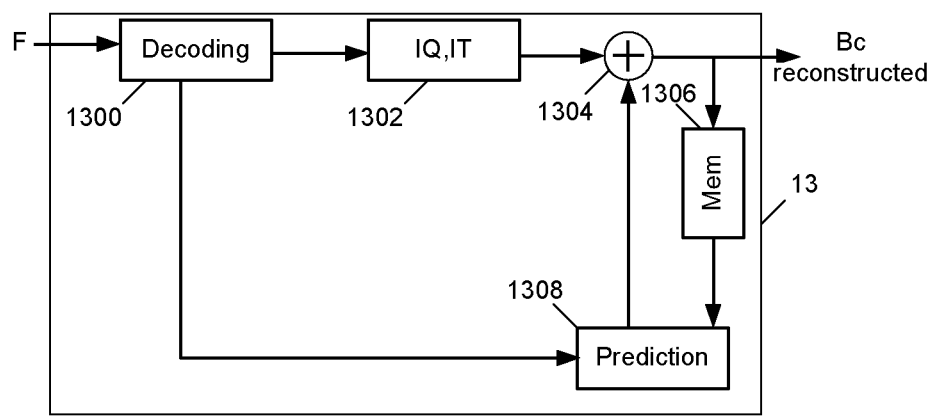

The invention will be better understood and illustrated by means of embodiments and advantageous implementations, by no means limiting, with reference to the figures in the appendix, wherein:

FIG. 1 shows a current block Bc and a reference block Br and their respective neighbourhoods Nc and Nr, FIG. 2 shows a decoding method according to the invention, FIG. 3 shows a coding method according to the invention, FIG. 4 shows a coding device according to the invention, and FIG. 5 shows a decoding device according to the invention.

5. DETAILED DESCRIPTION OF THE INVENTION

The invention relates to a method for decoding a stream of coded data F representative of a sequence of images with a view to the reconstruction of this sequence and a method for coding a sequence of images into the form of a stream of coded data F. A sequence of images is a series of several images. Each image comprises pixels or image points with each of which is associated at least one item of image data. An item of image data is for example an item of luminance data or an item of chrominance data.

The expression "brightness variation" is also known in English terminology as "luminance variation", "luminosity variation" or "illumination variation".

The term "motion data" is to be understood in the widest sense. It comprises the motion vectors and possibly the reference image indexes enabling a reference image to be identified in the image sequence. It can also comprise an item of information indicating the interpolation type that must be applied to the reference block to derive the prediction block.

The term "residual data" signifies data obtained after extraction of other data. The extraction is generally a subtraction pixel by pixel of prediction data from source data. However, the extraction is more general and comprises notably a weighted subtraction. This term is synonymous with the term "residue". A residual block is a block of pixels with which residual data is associated.

The term "transformed residual data" signifies residual data to which a transform has been applied. A DCT (Discrete Cosine Transform) is an example of such a transform described in chapter 3.4.2.2 of the book by I. E. Richardson entitled "H.264 and MPEG-4 video compression", published by J. Wiley & Sons in September 2003. The wavelet transforms described in chapter 3.4.2.3 of the book by I. E. Richardson and the Hadamard transform are other examples. Such transforms "transform" a block of image data, for example residual luminance and/or chrominance data, into a "block of transformed data" also called a "block of frequency data" or a "block of coefficients". The block of coefficients generally comprises a low frequency coefficient known under the name of continuous coefficient or DC coefficient and high frequency coefficients known as AC coefficients.

The term "prediction data" signifies data used to predict other data. A prediction block is a block of pixels with which prediction data is associated. A prediction block is obtained from a block or several blocks of the same image as the image to which belongs the block that it predicts (spatial prediction or intra-image prediction) or from one (mono-directional prediction) or several blocks (bi-directional prediction) of a different image (temporal prediction or inter-image prediction) of the image to which the block that it predicts belongs.

The term "reconstructed data" signifies data obtained after merging of residual data with prediction data. The merging is generally a sum pixel by pixel of prediction data to residual data. However, the merging is more general and comprises notably the weighted sum. A reconstructed block is a block of pixels with which reconstructed image data is associated.

FIG. 2 shows a method for decoding a stream of coded data F representative of a sequence of images. The method is described for a current block Bc and can be applied to several blocks of an image.

During a step 1, a prediction block Bpred is determined for the current block Bc. For example, the prediction block Bpred is determined from the motion data obtained in decoding a part of the stream of coded data F relating to the current block Bc. According to a variant, the prediction block Bpred is determined from reconstructed motion data by a template matching type method. Such a method is described in the document VCEG-AG16 by Steffen Kamp et al entitled *Decoder Side Motion Vector Derivation* and published on 20 Oct. 2007 at Shenzhen in China during the 33$^{rd}$ meeting of the VCEG group of the ITU-T.

During step 2, the average $avr_{pred}$ of the prediction block Bpred is determined. As a simple example, the average $avr_{pred}$ is equal to the average of luminance values associated with the pixels of the prediction block Bpred. According to a variant, the average $avr_{pred}$ is equal to the average of luminance and chrominance values associated with the pixels of the prediction block Bpred. According to another variant, the average $\text{avr}_{pred}$ is equal to the average of chrominance values associated with the pixels of the prediction block Bpred. During a step 4, the DC coefficient, noted as $I_{resDC}^{Qinv}$, of the current block Bc is reconstructed from the stream of coded data F. For this purpose, the coded data of F relating to the DC coefficient are decoded, by entropy decoding, into a quantized DC coefficient on which is applied an inverse quantization to obtain $I_{resDC}^{Qinv}$. Note that during this step the AC coefficients can also be reconstructed relating to the current block (in terms of residual error) that are used later to reconstruct Bc. For this purpose, the coded data of F relating to the AC coefficients are decoded, by entropy decoding, into quantized AC coefficients on which is applied an inverse quantization.

During a step 6, the average $\text{avr}_{cr\_dec}$ of the current block Bc is calculated from the average $\text{avr}_{pred}$ of the prediction block Bpred and the DC coefficient $I_{resDC}^{Qinv}$ as follows:

$$\text{avr}_{cr\_dec} = \text{avr}_{pred} I_{resDC}^{Qinv}/\text{scale}$$

where scale is a coefficient of proportionality linking the average value of a block and the value of the DC coefficient associated with the block in question. The proportionality coefficient depends on the transform (for example DCT 8×8, DCT 16×16, Hadamard, etc.) used to pass from the image domain to a transform domain to which the DC coefficient belongs. According to a variant, during step 6, the average value $\text{avr}_{cr\_dec}$ of the current block Bc is calculated from the average of the prediction block $\text{avr}_{pred}$ weighted by an initial weighted prediction parameter $\text{wp}_{cr}$ and the DC coefficient $I_{resDC}^{Qinv}$ as follows:

$$\text{avr}_{cr\_dec} = \text{avr}_{pred\_cr} + I_{resDC}^{Qinv}/\text{scale} \quad \text{with}$$
$$\text{avr}_{pred\_cr} = \text{wp}_{cr} * \text{avr}_{pred}$$

The initial weighted prediction parameter $\text{wp}_{cr}$ comes from for example one of the methods known in the art. For example, the initial weighted prediction parameter $\text{wp}_{cr}$ is decoded from the stream of coded data F. According to a variant, the initial weighted prediction parameter $\text{wp}_{cr}$ is determined by calculating the ratio between the average of a neighbourhood Nc of the current block and the average of the neighbourhood Nr corresponding to the reference block Br as shown in FIG. 1.

During a step 8, a weighted prediction parameter $\text{wp}_{cr\_dec}$ is determined by calculating the ratio between the average of the current block $\text{avr}_{cr\_dec}$ calculated in step 6 and the average of the prediction block $\text{avr}_{pred}$ calculated in step 2, i.e. $\text{wp}_{cr\_dec} = \text{avr}_{cr\_dec}/\text{avr}_{pred}$.

During a step 10, a residual block Bres is reconstructed for the current block Bc. For this purpose, the AC coefficients relating to the current block are reconstructed by decoding a part of the stream of coded data F relating to the current block Bc if they have not already been decoded during step 4. The block of coefficients comprising a null value instead of the DC coefficient and the reconstructed AC coefficients is transformed by inverse transformation into a residual block Bres.

During a step 14, the current block Bc is reconstructed by merging the residual block Bres reconstructed in step 10 and the prediction block Bpred weighted by the weighted prediction parameter $\text{wp}_{cr\_dec}$. For example, the current block Bc is equal to the pixel by pixel sum of the residual block Bres and the prediction block Bpred weighted by the weighted prediction parameter $\text{wp}_{cr\_dec}$: $Bc(i,j)=Bres(i,j)+\text{wp}_{cr\_dec}*Bpred(i,j)$, where (i,j) are the pixel coordinates.

According to a variant, the current block Bc is equal to the sum of filtered versions of residue and prediction blocks, according to an equation of type $$Bc(i, j) = \sum_{(k,l)} a(k, l) * Bres(i+k, j+l) + \text{wp}_{cr\_dec} * \sum_{(k,l)} b(k, l) * Bpred(i+k, j+l)$$

where a(.) and b(.) are the coefficients of linear filters. (k,l) are integer numbers that vary for example from −1 to 1. As a simple example, a( ) may take the following values:

| 1/64   | −10/64 | 1/64   |
|--------|--------|--------|
| −10/64 | 100/64 | −10/64 |
| 1/64   | −10/64 | 1/64   | and b( ) the following values

| 1/16 | 2/16 | 1/16 |
|------|------|------|
| 2/16 | 4/16 | 2/16 |
| 1/16 | 2/16 | 1/16 |

FIG. 3 shows a method for coding a sequence of images in the form of a stream of coded data F. The method is described for a current block Bc and may be applied to several blocks of an image.

During a step 15, a prediction block Bpred is determined for the current block Bc. For example, the prediction block Bpred is determined from motion data obtained by a motion estimation method of block matching type known to those skilled in the art of video coders/decoders. However, the invention is in no way limited by the method used to determine the prediction block Bpred.

During a step 16, the average $\text{avr}_{pred}$ of the prediction block Bpred and the average $\text{avr}_{cr}$ of the current block Bc are determined. As a simple example, the average $\text{avr}_{pred}$ is equal to the average of luminance values associated with the pixels of the prediction block Bpred. According to a variant, the average $\text{avr}_{pred}$ is equal to the average of luminance and chrominance values associated with the pixels of the prediction block Bpred. According to another variant, the average $\text{avr}_{pred}$ is equal to the average of chrominance values associated with the pixels of the prediction block Bpred. The same variants apply to the calculation of the average $\text{avr}_{cr}$ of the current block Bc.

During step 18, a prediction error $I_{resDC}$ is calculated between the average $\text{avr}_{cr}$ of the current block Bc and the average of the prediction block Bpred as follows:

$$I_{resDC} = (\text{avr}_{cr} - \text{avr}_{pred}) \times \text{scale}$$

This prediction error $I_{resDC}$ is proportional to the difference between the average $\text{avr}_{cr}$ of the current block Bc and the average $\text{avr}_{pred}$ of the prediction block Bpred. The coefficient of proportionality scale a coefficient linking the average value of a block and the value of the DC coefficient associated with the block in question. The proportionality coefficient depends on the transform (for example DCT 8×8, DCT 16×16, Hadamard, etc.) used to pass from the image domain to a transform domain to which the DC coefficient belongs.

According to a variant, during step 18, the prediction error $I_{resDC}$ is calculated from the average of the prediction block $\text{avr}_{pred}$ weighted by an initial weighted prediction parameter $\text{wp}_{cr}$ and the average $\text{avr}_{cr}$ of the current block Bc as follows:

$$I_{resDC} = (\text{avr}_{cr} - \text{avr}_{pred\_cr}) \times \text{scale} \quad \text{with}$$
$$\text{avr}_{pred\_cr} = \text{wp}_{cr} * \text{avr}_{pred}$$

The initial weighted prediction parameter $\text{wp}_{cr}$ is for example from one of the methods known to the prior art. For example the initial weighted prediction parameter $wp_{cr}$ is determined by calculating the ratio between the average of a neighbourhood Nc of the current block and the average of the neighbourhood Nr corresponding to the reference block Br as shown in FIG. 1.

According to another variant, the initial weighted prediction parameter $wp_{cr}$ is determined for a part of the image to which current block Bc according to the following steps:
- determining the average of the image part, called the first average,
- determining the average of the corresponding image part to which the prediction block belongs, called the second average, and
- calculating the weighted prediction parameter as being the ratio of the first average and the second average.

The image part is the entire image or an image slice. In this case, the coding method according to the invention comprises an additional step of coding of the initial weighted prediction parameter in the stream F of coded data.

During a step 20, a corrected average value $avr_{cr\_dec}$ of the current block Bc is calculated from the average $avr_{pred}$ of the prediction block Bpred and the prediction error successively quantized and dequantized as follows:

$$avr_{cr\_dec} = (avr_{pred} \times scale + I_{resDC}^{Qinv})/scale$$

with $I_{resDC}^{Qinv} = Q^{-1}(Q(I_{resDC}))$ where Q is a quantization operator and $Q^{-1}$ is the inverse quantization operator. According to a variant $avr_{pred}$ is replaced by $avr_{pred\_cr}$ in the equation above for the calculation of $avr_{cr\_dec}$.

During a step 22, a weighted prediction parameter $wp_{cr\_dec}$ is determined by calculating the ratio between the average of the current block $avr_{cr\_dec}$ calculated in step 20 and the average of the prediction block $avr_{pred}$ calculated in step 16.

During a step 26, the residual block Bres is determined by extracting from the current block Bc, the prediction block Bpred weighted via the weighted prediction parameter $wp_{cr\_dec}$. For example, the residual block Bres is equal to the difference pixel by pixel of the current block Bc and the prediction block Bpred weighted by the weighted prediction parameter $wp_{cr\_dec}$: $Bres(i,j) = Bc(i,j) - wp_{cr\_dec} * Bpred(i,j)$, where (i,j) are the coordinates of the pixels. According to a variant, the residual block Bres is equal to the difference between filtered versions of current and prediction blocks, according to an equation of type $$Bres(i, j) = \sum_{(k,l)} a'(k, l) * Bcur(i+k, j+l) - wp_{cr\_dec} * \sum_{(k,l)} b'(k, l) * Bpred(i+k, j+l)$$

where a'( ) and b'( ) are the coefficients of linear filters possibly different to the coefficients a( ) and b( ) defined previously. (k,l) are integer numbers that vary for example from −1 to 1. As a simple example, a'( ) may take the following values:

| 1/256   | −18/256 | 1/256   |
|---------|---------|---------|
| −18/256 | 324/256 | −18/256 |
| 1/256   | −18/256 | 1/256   | and b'( ) the following values

| 1/64 | 6/64  | 1/64 |
|------|-------|------|
| 6/64 | 36/64 | 6/64 |
| 1/64 | 6/64  | 1/64 |

During a step 28, the block Bres determined in step 26 is transformed into a block of coefficients comprising an initial DC coefficient, of null or very low value due to the correction by $wp_{cr\_dec}$, and the AC coefficients. The initial DC coefficient is then replaced by the prediction error $I_{resDC}$ calculated in step 18. $I_{resDC}$ is thus the DC coefficient effectively coded in the stream F. The block of coefficients thus modified is then quantized and coded by entropy coding. For example, an entropy coding method well known to those skilled in the art of entropy coding VLC (Variable Length Coding) type video coders, using for example the pre-calculated VLC tables as described in chapter 3.5.2 of the book by I. E. Richardson entitled "H.264 and MPEG-4 video compression" published by J. Wiley & Sons in September 2003 is used. According to a variant, a CABAC (Context-based Adaptive Binary Arithmetic Coding) type method can be used like that described in chapter 6.5.4 of the book by I. E. Richardson or again in section 9.3 of the ISO/IEC 14496-10 document entitled "Information technology—Coding of audio-visual objects—Part 10: Advanced Video Coding". According to another variant, a CAVLC (Context-based Adaptive Variable Length Coding) type method can be used like that described in section 9.2 of the ISO/IEC 14496-10 document entitled "Information technology—Coding of audio-visual objects—Part 10: Advanced Video Coding" as well as in chapter 6.4.13.2 of the book by I. E. Richardson.

The coding and decoding methods according to the invention have the advantage of improving the prediction method by taking account of the content of the current block, i.e. notably by not being limited to the content of its neighbourhood, and of adapting dynamically to the local variations of illumination without having to explicitly code the parameters relating to these local variations They also have the advantage of improving the coding efficiency in the case where no weighted prediction parameter is transferred in the stream.

The invention also relates to a coding device 12 described in reference to FIG. 4 and a decoding device 13 described in reference to FIG. 5. In FIGS. 4 and 5, the modules shown are functional units, that may correspond or not to physically distinguishable units. For example, these modules or some of them can be grouped together in a single component, or constitute functions of the same software. Conversely, some modules may be composed of separate physical entities.

In reference to FIG. 4, the coding device 12 receives at input images belonging to a sequence of images. Each image is divided into blocks of pixels each of which is associated with at least one item of image data. The coding device 12 notably implements a coding with temporal prediction. Only the modules of the coding device 12 relating to the coding by temporal prediction or INTER coding are shown in FIG. 12. Other modules not shown and known by those skilled in the art of video coders implement the INTRA coding with or without spatial prediction. The coding device 12 notably comprises a calculation module 1200 able to extract, for example by subtraction pixel by pixel, from a current block Bc a prediction block Bpred to generate a block of residual image data or residual block Bres. It further comprises a module 1202 able to transform then quantize the residual block Bres into quantized data. The transform T is for example a discrete cosine transform (or DCT). The coding device 12 further comprises an entropy coding module 1204 able to code the quantized data into a stream F of coded data. It further comprises a module 1206 performing the inverse operation of the module 1202. The module 1206 performs an inverse quantization $Q^{-1}$ followed by an inverse transformation $T^{-1}$. The module 1206 is connected to a calculation module 1208 capable merging, for example by addition pixel by pixel, the block of data from the module 1206 and the prediction block Bpred to generate a block of reconstructed image data that is stored in a memory 1210.

The coding device 12 further comprises a motion estimation module 1212 capable of estimating at least one motion vector between the block Bc and a block of a reference image Ir stored in the memory 1210, this image having previously been coded then reconstructed. According to a variant, the motion estimation can be carried out between the current block Bc and the original reference image Ic in which case the memory 1210 is not connected to the motion estimation module 1212. According to a method well known to those skilled in the art, the motion estimation module searches for an item of motion data, notably a motion vector in such a manner as to minimize an error calculated between the current block Bc and a block in the reference image Ir identified by means of the item of motion data.

The motion data determined are transmitted by the motion estimation module 1212 to a decision module 1214 able to select a coding mode for the block Bc in a predefined set of coding modes. The coding mode retained is for example that which minimizes a bitrate-distortion type criterion. However, the invention is not restricted to this selection method and the mode retained can be selected according to another criterion for example an a priori type criterion. The coding mode selected by the decision module 1214 as well as the motion data, for example the item or items of motion data in the case of the temporal prediction mode or INTER mode are transmitted to a prediction module 1216. The prediction module 1216 is able to implement the steps 15 to 22 of the coding method according to the invention. The coding mode selected and if need be the motion data are also transmitted to the entropy coding module 1204 to be coded in the stream F. The prediction module 1216 determines the prediction block Bpred from the coding mode determined by the decision module 1214 and possibly from the motion data determined by the motion estimation module 1212 (inter-images prediction).

In reference to FIG. 5, the decoding module 13 receives at input a stream F of coded data representative of a sequence of images. The stream F is for example transmitted by a coding device 12 via a channel. The decoding device 13 comprises an entropy decoding module 1300 able to generate decoded data, for example coding modes and decoded data relating to the content of the images.

The decoding device 13 also comprises a motion data reconstruction module. According to a first embodiment, the motion data reconstruction module is the entropy decoding module 1300 that decodes a part of the stream F representative of said motion data. According to a variant not shown in FIG. 13, the motion data reconstruction module is a motion estimation module. This solution for reconstructing motion data via the decoding device 13 is known as "template matching".

The decoded data relating to the content of the images is then transmitted to a module 1302 able to carry out an inverse quantization followed by an inverse transform. The module 1303 is identical to the module 1206 of the coding device 12 having generated the coded stream F. The module 1302 is connected to a calculation module 1304 able to merge, for example by addition pixel by pixel, the block from the module 1302 and a prediction module Bpred to generate a reconstructed current block Bc that is stored in a memory 1306. The decoding device 13 also comprises a prediction module 1308. The prediction module 1308 determines the prediction block Bpred from the coding mode decoded for the current block by the entropy decoding module 1300 and possibly from motion data determined by the motion data reconstruction module. The prediction module 1308 is able to implement steps 1 to 8 of the decoding method according to the invention.

Naturally, the invention is not limited to the embodiment examples mentioned above.

In particular, those skilled in the art may apply any variant to the stated embodiments and combine them to benefit from their various advantages. The invention is in no way limited by the type of transform. Notably the invention can be used with a DCT transform, a Hadamard transform or a wavelets transform.

The invention claimed is:

1. A method comprising:
   accessing coded data representative of at least a portion of an image divided into blocks;
   calculating an average of a current block of said blocks from an average of a prediction block of said current block and from a DC coefficient reconstructed for said current block,
   calculating a weighted prediction parameter equal to a ratio of the average of said current block and the average of said prediction block;
   transforming a block of coefficients into a residual block, wherein said block of coefficients comprises a null value as DC coefficient and AC coefficients reconstructed for said current block; and
   reconstructing the current block by merging said residual block and said prediction block, said prediction block being weighted by said weighted prediction parameter.

2. The method according to claim 1, wherein calculating the average of said current block comprises weighting said average of said prediction block by a decoded initial weighted prediction parameter.

3. The method according to claim 1, wherein calculating the average of said current block comprises weighting said average of said prediction block by an initial weighted prediction parameter equal to a ratio between an average of a neighbourhood of the current block and an average of a corresponding neighbourhood of a reference block associated with said current block.

4. A method comprising:
   accessing at least a portion of an image divided into blocks;
   calculating a prediction error between an average of a current block of the blocks and an average of a prediction block of said current block,
   calculating a corrected average of said current block from said average of said prediction block and from the prediction error successively quantized and dequantized;
   calculating a weighted prediction parameter equal to a ratio of the corrected average of said current block and the average of said prediction block;
   determining a residual block by extracting from said current block said prediction block being weighted by said weighted prediction parameter, and
   coding said residual block by transforming said residual block into a DC coefficient and AC coefficients, by quantizing said AC coefficients and by entropy coding the quantized prediction error and said quantized AC coefficients.

5. The method according to claim 4, wherein, calculating said prediction error comprises weighting said average of said prediction block by an initial weighted prediction parameter and coding said initial weighted prediction parameter.

6. The method according to claim 5, wherein, said initial weighted prediction parameter is determined for a part of the image to which said current block belongs by:
  determining an average of said image part, called a first average,
  determining an average of the corresponding image part to which a reference block associated with said current block belongs, called a second average, and
  calculating said weighted prediction parameter as the ratio of said first average and said second average.

7. The method according to claim 6, in which said image part is the entire image.

8. The method according to claim 6, in which said image part is an image slice.

9. The method according to claim 4, wherein calculating said prediction error comprises weighting said average of said prediction block by an initial weighted prediction parameter equal to a ratio between an average of a neighbourhood of the current block and an average of the corresponding neighbourhood of a reference block associated with said current block.

10. A decoding device comprising:
  a memory; and
  a processor coupled to the memory, the processor configured to:
    access coded data representative of at least a portion of an image divided into blocks,
    calculate an average of a current block, of the blocks, from an average of a prediction block of said current block and from a DC coefficient reconstructed for said current block,
    calculate a weighted prediction parameter equal to a ratio of the average of said current block and the average of said prediction block,
    transforming a block of coefficients into a residual block, wherein said block of coefficients comprises a null value as DC coefficient and AC coefficients reconstructed for said current block, and
    reconstruct the current block by merging said residual block and said prediction block, said prediction block being weighted by said weighted prediction parameter.

11. The decoding device according to claim 10, wherein to calculate the average of said current block comprises weighting said average of said prediction block by a decoded initial weighted prediction parameter.

12. The decoding device according to claim 10, wherein to calculate the average of said current block comprises weighting said average of said prediction block by an initial weighted prediction parameter equal to a ratio between an average of a neighbourhood of the current block and an average of a corresponding neighbourhood of a reference block associated with said current block.

13. A coding device comprising:
  a memory; and
  a processor coupled to the memory, the processor configured to:
    access at least a portion of an image divided into blocks;
    calculate a prediction error between an average of a current block, of the blocks, and an average of a prediction block of said current block,
    calculate a corrected average of said current block from said average of said prediction block and from the prediction error successively quantized and dequantized,
    calculate a weighted prediction parameter equal to a ratio of the corrected average of said current block and the average of said prediction block,
    determine a residual block by extracting from said current block said prediction block being weighted by said weighted prediction parameter, and
    code said residual block by transforming said residual block into a DC coefficient and AC coefficients, by quantizing said AC coefficients and by entropy coding the quantized prediction error and said quantized AC coefficients.

14. The coding device according to claim 13, wherein, to calculate said prediction error comprises weighting said average of said prediction block by an initial weighted prediction parameter and coding said initial weighted prediction parameter.

15. The coding device according to claim 14, wherein said initial weighted prediction parameter is determined for a part of the image to which said current block belongs by:
  determining an average of said image part, called a first average,
  determining an average of the corresponding image part to which a reference block associated with said current block belongs, called a second average, and
  calculating said weighted prediction parameter as the ratio of said first average and said second average.

16. The coding device according to claim 15, in which said image part is the entire image.

17. The coding device according to claim 15, in which said image part is an image slice.

18. The coding device according to claim 13, wherein to calculate said prediction error comprises weighting said average of said prediction block by an initial weighted prediction parameter equal to a ratio between an average of a neighbourhood of the current block and an average of the corresponding neighbourhood of a reference block associated with said current block.

19. A non-transitory computer readable medium having stored thereon software that, when executed by a processor, performs:
  accessing coded data representative of at least a portion of an image divided into blocks;
  calculating an average of a current block, of said blocks, from an average of a prediction block of said current block and from a DC coefficient reconstructed for said current block;
  calculating a weighted prediction parameter equal to a ratio of the average of said current block and the average of said prediction block;
  transforming a block of coefficients into a residual block, wherein said block of coefficients comprises a null value as DC coefficient and AC coefficients reconstructed for said current block; and
  reconstructing the current block by merging said residual block and said prediction block, said prediction block being weighted by said weighted prediction parameter.

20. The non-transitory computer readable medium according to claim 19, wherein calculating the average of said current block comprises weighting said average of said prediction block by a decoded initial weighted prediction parameter.

21. The non-transitory computer readable medium according to claim 19, wherein calculating the average of said current block comprises weighting said average of said prediction block by an initial weighted prediction parameter equal to a ratio between an average of a neighbourhood of the current block and an average of a corresponding neighbourhood of a reference block associated with said current block.

22. A non-transitory computer readable medium having stored thereon software that, when executed by a processor, performs:
- accessing at least a portion of an image divided into blocks;
- calculating a prediction error between an average of a current block of the blocks and an average of a prediction block of said current block,
- calculating a corrected average of said current block from said average of said prediction block and from the prediction error successively quantized and dequantized;
- calculating a weighted prediction parameter equal to a ratio of the corrected average of said current block and the average of said prediction block;
- determining a residual block by extracting from said current block said prediction block being weighted by said weighted prediction parameter; and
- coding said residual block by transforming said residual block into a DC coefficient and AC coefficients, by quantizing said AC coefficients and by entropy coding the quantized prediction error and said quantized AC coefficients.

23. The non-transitory computer readable medium according to claim 22, wherein, calculating said prediction error comprises weighting said average of said prediction block by an initial weighted prediction parameter and coding said initial weighted prediction parameter.

24. The non-transitory computer readable medium according to claim 23, wherein said initial weighted prediction parameter is determined for a part of the image to which said current block belongs by:
- determining an average of said image part, called a first average,
- determining an average of the corresponding image part to which a reference block associated with said current block belongs, called a second average, and
- calculating said weighted prediction parameter as the ratio of said first average and said second average.

25. The non-transitory computer readable medium according to claim 24, in which said image part is the entire image.

26. The non-transitory computer readable medium according to claim 24, in which said image part is an image slice.

27. The non-transitory computer readable medium according to claim 22, wherein calculating said prediction error comprises weighting said average of said prediction block by an initial weighted prediction parameter equal to a ratio between an average of a neighbourhood of the current block and an average of the corresponding neighbourhood of a reference block associated with said current block.

* * * * *